Patented Feb. 9, 1943

2,310,492

UNITED STATES PATENT OFFICE 2,310,492

RECOVERING RESINS FROM COAL

Adriaan Nagelvoort, Salt Lake City, Utah

No Drawing. Application December 5, 1940,
Serial No. 368,737

5 Claims. (Cl. 209—173)

This invention or discovery relates to recovering resins from coal; and it comprises a method of recovering kauri type hard copals existing as granular inclusions in various bituminous coals wherein such coal is granulated to small particle size and is admixed with an inert liquid of such specific gravity and with such adjustment of conditions that the resins and the coal are separated by sink-and-float action; the separated resin usually being given further sink-and-float treatments to free it from heavy, dark resinous impurities and to separate waxes and associated impurities, with recovery of the purified resin as a light colored uniform useful product capable of being run and worked into varnish vehicles such as linseed oil; all as more fully hereinafter set forth and as claimed.

Hard copal resins of the kauri type exist as I have found, in granular form in various coals, notably the upper seams of Utah bituminous coal. The resins are scattered throughout the coal in small lumps, of size ranging from that of sand to walnut size. The lumps vary in color from light lemon yellow to deep red. Recovered in a pure condition these resins are useful in making oil varnish and for similar purposes. These resins are insoluble in most solvents but, like the kauri type copals, they can be "run" and are afterwards soluble in drying oils, such as linseed oil.

No successful attempts have been made to separate the resin from coal in commercial quantities and recover it for use in varnishes. Mineral flotation methods, in which attempt is made to film particles of one constituent of a mixture with oil with introduction of air to float the constituent as a froth, have not proved practicable. Both the coal and the resin float. Solvent extraction is impracticable because of the small solubility of hard copal resins in any ordinary solvent. In using solvents on these coals there is an extraction of waxes of the type of montan wax and only the softer and less valuable resins are attacked. Kauri type copal remains undissolved. All extracts made with the ordinary solvents are dark and soft; a good hard resin is not recovered.

I have, however, found that there are slight differences in specific gravity between the copal inclusions and the substance of the coal and that these are sufficient to permit a flotation separation by careful manipulation. Mostly, in order to obtain a resin of commercial purity, repeated treatments are required. The resin can be floated away from the coal in a liquid bath of suitable specific gravity and other properties, and in turn the accompanying waxes, etc., can later be floated away from the resin. It is furthermore possible by repetition of separation to achieve a purification of the resin itself, by a separation of dark resinous impurities. Here again, the differences in specific gravity can be utilized, even though the difference in specific gravities there available is very slight. Such separation of resinous impurities is best carried out between the two steps; between the first separation of resin from the coal and the final removal of waxy impurities.

The liquids employed for the separation are inorganic aqueous solutions and have no solvent effect on any of the constituents of the coal. The resin is unharmed. Since neither the coal itself nor the resin and waxes are readily wetted by water or aqueous solutions to a sufficient extent for ready flotation, I employ wetting agents in the solutions. The selection of a suitable wetting agent is an important step in achieving the desired results. With the small available differences in specific gravity, if the liquid fails to wet one of the components of the mixture, that component may float even though its real specific gravity is enough to make it sink. The apparent specific gravity of the unwet granule carrying air may be sufficient to make it buoyant.

With suitable operation, separation is clean and complete. On the average, from a ton (2000 pounds) of raw Utah bituminous coal from upper seams, 100 pounds of high-grade varnish resin can be recovered. The resin is comparable with the better grade kauri resins and similar copals, and is commercially acceptable; it is accepted by varnish makers as a high-grade copal or varnish resin. Varnishes made with it give hard glossy, permanent films remarkably resistant to weathering; so much so in fact that paints and pigmented varnishes made with the resin obtained according to the invention stand up exceptionally well as highway markings. This is an exceptionally severe test for a paint or varnish.

As an incidental but important advantage of the invention, the coal from which the resin has been separated has lost practically all of its soot-forming properties. It burns clean with a smokeless flame and commands a higher price than raw coal. Resin separation therefore gives a better coal as a byproduct.

In practicing the invention, the coal, after preliminary cleaning to remove gangue if necessary, is ground to a convenient size, and is then introduced into a suitable sink-and-float treatment vessel: an inverted open-topped cone, arranged for overflow of floating material at the top and withdrawal of sunken material at the bottom. The vessel contains a body of an aqueous solution of suitable specific gravity, between that of coal and resin, and containing dissolved therein a suitable wetting agent. Tannic acid, saponin, ethyl alcohol and isopropyl alcohol are all good wetting agents for this step. The coal sinks and the resin, together with waxes, etc., floats.

In the next step, the resin is separated from certain dark resinous components with the aid of a salt solution of specific gravity just lower than that of the dark resin and higher than that of the valuable resin. The salt solution contains an agent such as saponin capable of wetting the resins. In the purification step, the wax is floated away from the valuable resin.

The coal, wax and dark resinous impurity can all be recovered as useful byproducts.

The purified resin is now dried and is marketable for use by the varnish maker.

The wetting agents employed at some of the stages may be those acting preferentially. For example, coal is readily wetted by water containing tannic acid in proportion only 1 part per million, but the resin and waxes are not so easily wetted. In the step of separating the coal from the resin and wax it is not important that the resin and wax be wetted; they float anyway. But provision is made to wet the coal as otherwise it would tend to float. In separating the light from the dark resin, wetting of the resins is important. Addition of saponin or tannic acid to the brine in a proportion of 1 part in 100,000 insures wetting. In separating the waxes from the resin, saponin, in proportion 1 part in 100,000, is satisfactory. The waxes do not need to be wetted as they float anyway.

For the aqueous solutions almost any salt or other compound can be used that is inert with respect to the resin and that is sufficiently soluble to enable preparation of solutions of the required density. Common salt (NaCl) and $CaCl_2$ are cheap and convenient.

In a specific example illustrative of a typical procedure within the purview of the invention, a batch of upper-seam Utah bituminous coal was ground to −20 mesh particle size. Analysis of the coal showed the specific gravities of the constituents to be as follows:

Waxes: Specific gravity about 0.800
Resins: Specific gravity about 1.05 to 1.09; the lighter fractions corresponding to the valuable resins.
Coal: Specific gravity about 1.150+

The ground coal was introduced into a conical vessel provided with an efficient stirring agitator and containing a body of salt brine of specific gravity 1.100 containing tannic acid 1:1000000. After a suitable period of agitation the agitator was shut off and the coal allowed to sink, while the resin floated to the top and was discharged by displacement. (Without the wetting agent the coal would ordinarily float rather than sink in this bath, due to non-liquid-filled pores. The separated resin, amounting to about 5 per cent of the weight of the coal, was washed with water and introduced into a second vessel containing a salt solution of specific gravity 1.07 with saponin dissolved therein in a proportion of 1:100000. After agitation, the mixture was allowed to stand and a small proportion of dark off-color resin settled to the bottom, leaving the valuable resin floating. The floated fraction was washed with water and introduced into a third agitated vessel containing plain water with a little saponin; 1:100000. Wax and woody matters floated and the purified resin was withdrawn at the bottom and was washed and dried. The wax amounted to a few per cent by weight of the resin. The wash waters from the three operations were saved. Those from the first two operations were made up to proper specific gravity for reuse by additions of salt.

The purified recovered resin had a specific gravity close to 1.059 and was hard and light colored. Made into varnishes in the usual way, it gives good glossy finishes of high durability and inert to acids and alkalies in reasonable concentrations and to alcohols. The amount of driers employed is the same as with high-grade kauri and like resins. Linseed oil is the best vehicle at present known to me for utilizing the (run) resin in varnishes.

The specific gravities of the several components of the coal do not always bear the same relation to each other as in the specific example. The specific gravities of the sink-and-float baths are adjusted, following the principles described, for proper gravital separation of the components of the particular coal under treatment.

The coal, wax and dark resinous impurities can all be recovered as useful byproducts.

Various kinds of coal contain different kinds of resins and sometimes different resins occur in the same coal. There is sufficient difference in specific gravity between the different kinds of resins to allow gravital separation, according to the principles set forth, of the resin most suitable for a particular need.

What I claim is:

1. A method of recovering kauri-type varnish-making resins capable of being run and dissolved in varnish vehicles, from coal containing resins associated with waxes which comprises granulating the coal to small particle size, introducing the granules into an aqueous solution of an inorganic compound of specific gravity between that of coal and resin containing therein a wetting agent in amount to wet the coal whereby the resins and waxes float and the coal sinks, recovering the floating resins and waxes and introducing them into an aqueous solution of an inorganic compound inert to resin having a specific gravity between the specific gravity of resin and wax, and a wetting agent in amount to wet the resin whereby the waxes float and the resins sink, and recovering the resins.

2. The method of claim 1 wherein the aqueous solution is a salt brine containing a wetting agent of such character as to cause the brine to wet the coal and fill the pores thereof, thereby to facilitate separation due to differences in specific gravity.

3. A method of recovering kauri-like varnish-making copals or resins from coal containing resins associated with resinous impurities and waxes which comprises introducing the coal in granular form into an aqueous solution of an inorganic compound inert to resin, having a specific gravity between that of coal and resin, and a wetting agent in amount to wet the coal whereby the coal sinks and the resins and associated matters float, recovering the floating resins and associated matters, introducing them into an aqueous solution of an inorganic compound inert to resin, having a specific gravity between the specific gravity of resin and wax, and a wetting agent in amount to wet the resinous impurities, whereby the resinous impurities sink and the resins and waxes float, introducing the floated resins and waxes into an aqueous inorganic solution of specific gravity between that of resin and wax containing a wetting agent in amount to wet the resin, whereby the waxes float and the resins sink, and recovering the resins.

4. A method of recovering varnish-making copals or resins from coal containing resins associated with resinous impurities and waxes which comprises introducing the coal in granular form into an aqueous inorganic solution of specific gravity between that of coal and resin containing a coal wetting agent in amount to wet the coal, whereby the coal sinks and the resins and associated matters float, recovering the floating resins and associated matters, introducing them into an aqueous inorganic solution of specific gravity between that of resins and of the heavier resinous impurities associated therewith, said aqueous solution containing a wetting agent in amount sufficient to wet the resins, whereby the resinous impurities sink and the resins and waxes float, introducing the floated resins and waxes into an aqueous inorganic solution of specific gravity between the specific gravity of resin and wax, said aqueous solution containing a wetting agent in amount sufficient to wet the resin whereby the waxes float and the resins sink, and recovering the resins from said bath.

5. In separating valuable copal resins from coal by utilizing differences in their specific gravities, the step which comprises introducing granulated resiniferous coal into an inert aqueous liquid bath of specific gravity intermediate that of the resin and the coal and containing a dissolved substance which is characterized by the property of causing the aqueous liquid to wet the coal whereby the coal sinks and the resin floats, separating resinous impurities and waxes from the floated resin in inert aqueous inorganic solutions of specific gravity intermediate the specific gravities of the separable components, such inert solutions containing selective wetting agents in amount sufficient to wet the component to be depressed.

ADRIAAN NAGELVOORT.